United States Patent [19]

Rowsell

[11] Patent Number: 5,176,831
[45] Date of Patent: Jan. 5, 1993

[54] METHOD FOR HERDING AND/OR RECOVERING SPILLED OIL

[76] Inventor: Farrell D. Rowsell, 2665 Belcastro St., Las Vegas, Nev. 89117

[21] Appl. No.: 784,458

[22] Filed: Oct. 28, 1991

[51] Int. Cl.$^5$ .............................................. C02F 1/28
[52] U.S. Cl. .................... 210/631; 210/691; 210/693; 210/702; 210/730; 210/923; 210/924; 210/925
[58] Field of Search ............. 210/691, 692, 693, 705, 210/708, 728, 730, 924, 925, 923, 922, 908, 631, 776

[56] References Cited

U.S. PATENT DOCUMENTS

| | | | |
|---|---|---|---|
| 2,531,427 | 11/1950 | Hauser | 260/448 |
| 2,966,506 | 12/1960 | Jordan | 260/448 |
| 3,634,227 | 1/1972 | Patterson | 210/11 |
| 3,948,770 | 4/1976 | Goodrich | 210/40 |
| 4,444,665 | 4/1984 | Hildebrandt | 210/691 |
| 4,473,477 | 9/1984 | Beall | 210/691 |
| 4,517,094 | 5/1985 | Beall | 210/691 |
| 4,650,590 | 3/1987 | Beall | 210/691 |
| 4,778,627 | 10/1988 | Doan | 252/631 |
| 5,028,338 | 7/1991 | Hooykaas | 210/691 |
| 5,130,028 | 7/1992 | Cody et al. | 210/691 |

Primary Examiner—Stanley S. Silverman
Assistant Examiner—Neil M. McCarthy
Attorney, Agent, or Firm—Dorr, Carson, Sloan & Peterson

[57] ABSTRACT

Oil spills on natural bodies of water are treated with amine-substituted water swelling clays. The organoclays are added to oil spills in an amount which herds oil into islands of oil separated by surfaces of water containing no oil. The clays can also be added to oil spills in an amount which produces quasisolid, buoyant organoclay/oil flocculate clumps which float in the water and which are amenable to collection from the surface of the water.

42 Claims, No Drawings

METHOD FOR HERDING AND/OR RECOVERING SPILLED OIL

BACKGROUND OF THE INVENTION

1. Field Of the Invention

This invention generally relates to methods of cleaning up oil spills from natural bodies of water such as oceans, seas, lakes, harbors and rivers. More specifically, this invention relates to methods for flocculating and/or agglomerating spilled oil associated with a natural body of water, such as a floating layer or film of oil and/or dispersed oil droplets, emulsions, etc., in order to facilitate subsequent physical recovery, containment, or further treatment of such oil.

2. Prior Art

Oil pollution of natural bodies of water, and especially of the ocean, has caused extensive environmental problems and ever mounting public concern. Such pollution has been caused by illegal dumping, accidents, warfare and leakage from oil drilling operations in continental shelf regions. Regardless of their cause, however, oil spills invariably produce extensive ecological and/or economic damage by destroying or tainting many forms of aquatic life and by fouling water intakes, recreational beaches, boats, fishing gear, harbor installations and the like.

Unfortunately, oil cleanup operations are both physically and technically difficult; they normally involve one or more of the following measures: (1) physical removal of the oil from the water, with or without the use of adsorbents, (2) dispersion of the oil through the use of detergents, (3) "sinking" the spilled oil and (4) burning floating oil slicks. Each of these measures has its own set of special environmental and technical considerations.

Physical removal (e.g., by "skimming" or pumping operations) is of course the most ecologically desirable remedy but, using existing technologies, it is feasible only under nearly ideal weather, water turbulence and response time conditions. Generally speaking, seas higher than about 1-2 feet, currents in excess of 2-3 knots and/or the passage of a few day's time usually makes physical removal operations largely ineffective and extremely costly.

Dispersion of spilled oil through the use of detergents can be accomplished much more quickly, but this technology has several detrimental side effects. For example, the detergents normally employed to disperse spilled oil are very often toxic to aquatic life in their own right. Moreover, their use also tends to bring the spilled oil into more intimate contact with living organisms than it might otherwise attain.

Sinking has its own set of detrimental side effects, e.g., sinking strongly retards the ultimate degradation of the oil by incorporating it into underwater sediments where anaerobic conditions may prevail. However, not all water body bottoms are anaerobic or biologically inert. For example, nearshore areas often have high levels of biological activity as evidenced by the presence of kelps, shellfish, worms, etc. in such areas. Consequently, these forms of life may be completely wiped out by "sinking" an oil spill into their delicate habitats.

Burning is of course greatly restricted by: the difficulties associated with getting "oil-on-water" fires started, ecological concerns regarding any incomplete burning of the oil and any attendant air pollution problems produced by such burning. Obviously, such burning also will be restricted by any local fire hazard considerations. Burning also represents a total economic waste of the oil.

Certain physical removal methods are accompanied by the use of adsorbents such as finely divided or porous solid materials (e.g., straw, clays, sawdust, etc.) in order to help agglomerate oil films and/or oil/water emulsions. Such agglomeration is desirable because it ultimately aids in the physical gathering of the spilled oil. In effect, agglomeration of this kind produces relatively large, thick, distinct, patches or globs of more viscous, but still "liquid", oil from those relatively thin slicks or films of oil which reside on the water's surface and/or from those finely dispersed, droplets which comprise oil/water emulsions. This agglomeration action is brought about by surface and capillary actions of these materials upon spilled oil. Various clays have been used or at least suggested for use as such oil agglomeration agents, e.g., attapulgite, bentonite, kaoln and montmorillonite are most frequently suggested.

However, cleanup operations using such clays have not been widely employed, largely because—in spite of their ability to sorb oil—such clays also tend to allow the oil to desorb in relatively short periods of time. That is to say that these clays, in the context of an oil spill on water, tend to allow the oil to desorb before the oil patches produced by them can be physically collected or otherwise treated, e.g., by chemical treatment, microorganism digestion, etc. The use of such clays, in absence of other floatable materials such as sawdust, wood chips, etc., also tends to produce agglomerated materials which may well sink. Moreover, even if a floating oil film and/or a finely dispersed oil/water emulsion can be successfully converted to relatively large droplets of oil by the use of such clays, and even if those large droplets, once formed, form distinct patches which can exist on the surface of the water for periods of time long enough to be successfully collected, the inherent problems generally associated with separating one liquid from another liquid still remain as a distinctly troublesome part of the overall cleanup problem.

For example, the "liquid from liquid" (i.e., oil from water) separation problem which must be overcome in order to clean up an oil spill generally entails picking up large volumes of water along with an agglomerated oil/clay material which has an essentially "liquid" character. In fact, a very large proportion of the total material picked up in such cleanup operations is in fact water. That is to say that oil cleanup operations which use the previously noted clays in order to agglomerate oil films and/or oil/water emulsions into larger oil droplets and/or into larger oil patches do not avoid the problem of mechanically taking up (e.g., by suction and/or pumping operations) those large volumes of water with which relatively the smaller volumes of liquid oil are associated. Consequently, various additional "oil from water" separation processes are needed to complete the overall cleanup operation. They are normally performed in tanks on board ships, barges, tenders, etc. under those relatively controlled, quiescent, conditions needed to effect the physical and/or chemical separation of these two liquids as well as any clays, straws, sawdust, etc. with which these fluids are associated. Thus, large volumes of oil-contaminated water must be physically handled and chemically treated, in closed vessels, in order to successfully capture those relatively small volumes of oil associated with the oil-contaminated water. The expense of handling and treating such large volumes of water is enormous. Worse yet, the time needed to take up and treat such large volumes of water and its associated oil is painfully long when viewed from the standpoint that the spilled oil is relentlessly damaging the environment while simultaneously becoming more and more difficult to recover as it becomes more and more dispersed with the passage of time.

Some representative methods for using clays to convert oil films and/or oil/water emulsions into larger oil droplets and patches in order to facilitate subsequent oil/water separation operations are taught in the following patent references which are each incorporated by reference into this patent disclosure.

U.S. Pat. No. 3,634,227 generally teaches use of various clays such as attapulgite, bentonite, and kaolin to agglomerate spilled oil in order to facilitate its collection from the surface of the water.

U.S. Pat No. 2,531,427 teaches that clays of the same type employed by applicants can be substituted with amine groups to produce "organoclays" which are generally capable of forming stable gels and colloidal dispersions in various industrial processes. In general, the amine-treated clays taught by this reference constitute the same kinds of "organoclays" employed by applicants in their processes.

U.S. Pat. No. 4,778,627 teaches a process for disposing of radioactive liquid hydrocarbons by adding an organic ammonium montmorillonite clay to such liquids in quantities sufficient to produce a solid waste product.

U.S. Pat. No. 3,948,770 teaches that mixtures of finely dispersed oil droplets and sea water, and especially those present in oil tanker compartments, can be separated through the use of a flocculating agent comprised of a dry powered mixture of an anionic polyelectrolyte, such as an anionic copolymer of acrylamide, and a montmorillonite clay. This reference also notes that when small quantities of oil are finely dispersed within a relatively large body of water—a situation typically found in the slop tanks of large oil tankers—separation of those fine droplets of oil is normally extremely slow and that a much more rapid agglomeration into a distinct oil phase may be obtained by use of the therein disclosed anionic polyelectrolyte/clay mixture.

U.S. Pat. No. 4,473,477 ("the 477 patent") teaches that certain organoclays of the same type employed in applicants' patent disclosure can be used to solidify fluid waste materials in retention ponds or lagoons designed to hold such fluid waste materials. Typically the fluid wastes are contained by an impermeable liner which forms the bottom and sides of the waste pond. This reference also teaches that an adjunct bed of such organoclays can be employed in order to capture certain organic contaminants before they enter local ground waters. Thus, a contaminated fluid flowing through these beds will have its associated organic materials removed by the bed so that the resulting leachate (e.g., water) can be safely released into the environment.

In another embodiment of the invention described in the 477 patent (which embodiment is discussed from column 7, line 56 to column 8, line 3 of this reference), an organoclay is sprayed on an artificial lagoon containing an oil-contaminated fluid such as water. In this particular embodiment, the organoclays are added in quantities such that the organoclay sorbs the oil and forms agglomerate clumps which sink to the bottom and/or sides of the lagoon in order to produce an impermeable layer or liner "plug" which serves to stop the flow of oil-contaminated water into local ground waters.

SUMMARY OF THE INVENTION

Applicants have discovered a process for flocculating and/or agglomerating spilled oil (for the purposes of this patent disclosure, the terms "flocculation" and "agglomeration" may be taken to mean substantially the same thing) associated with a natural body of water, e.g., spilled oil associated with such water as a floating oil film and/or as dispersed oil droplets, emulsions, etc. Such flocculation can be used to facilitate recovery, containment or further treatment of the spilled oil. For example, such further treatment may be by additional chemical and/or biological degradation or digestion of the oil. For example, in some special oil spill situations, e.g., spills in relatively shallow bodies of water, applicants' process may serve to cause a more or less continuous surface film of oil (which shuts off light and oxygen passage through the water) to be broken up and "herded" into relatively small "islands" of agglomerated oil and thereby leaving large openings of clear water which will pass sunlight and, hence, which will aid in the survival of many flora and fauna which otherwise would perish under a film of oil on their water habitat. In such usage the flocculation agent may also be called a "herding agent." In most cases, however, the spilled oil will not only be "herded", it also will be further flocculated into floating, solid clumps.

Generally speaking, the process of this patent disclosure comprises adding an amine-substituted clay to an oil-contaminated body of water. Again, this is done in order to flocculate and/or agglomerate the oil contained in a continuous "film" on the surface of the water and/or contained in an oil/water emulsions into: (a) small (relative to the size of an oil film) distinct oil patches or "islands" separated by spaces of unpolluted water or (b) distinct buoyant, quasisolid, clumps which are particularly characterized by their possession of mechanical strength sufficient to enable said clumps to be gathered as if they were "solids." For the purposes of this patent disclosure, clumps having levels of mechanical strength sufficient to enable the clumps to be picked up out of the water, without appreciable breakage of said clumps, will be referred to as "quasi-solid" clumps. Regardless of technology, clumps having these characteristics can be much more efficiently gathered than those more "liquid" forms of clay/oil agglomerates which are produced by those "natural", i.e., "untreated", clays which do not contain the herein disclosed amine and/or amine/organic substituents.

The amine-substituted clays used in our process are generally produced by reacting a water swelling clay, e.g., a smectite clay, with an amine compound selected from the group consisting of a primary amine salt, a secondary amine salt, a tertiary amine salt or a quaternary ammonium salt. Each of these salts is, most preferably, further characterized by its possession of an organosubstituent in order to produce a material which might be characterized as an "organoclay" flocculation agent. Thus, less preferred, but still very useful, amine substituted clays for the practice of this invention may have no organo group substituent; but our more preferred flocculation agents also will have certain hereinafter described organo groups as part of their overall chemical structures.

In either case however, because the amine substitution of the clay molecule is such an extremely important aspect of this invention, those clays which are capable of undergoing reactions with amine compounds, e.g., those having substantial ion exchange capacities, generally will constitute the more preferred starting materials for the clays used in making the flocculation agents employed by this particular process. The more preferred amine-substituted clays and/or organo organoamine-substituted clays for the practice of this invention, as well as certain preferred methods for producing them, are generally described in U.S. Pat. Nos. 4,473,477 and 2,531,427 and these two references are specifically incorporated by reference, in their entireties, into this patent disclosure.

Applicants' amine-substituted clay flocculation agents may be added to the oil-polluted water in widely varying proportions depending upon the end result desired in a given embodiment of applicants' process. As a minimum requirement however, applicants' clays should be added to the oil-contaminated water in amounts sufficient to at least promote a "herding effect" upon an oil film. For the purposes of this patent application the expression "herding effect" can be taken to indicate the phenomenon wherein a continuous oil layer, slick or film is (even before any solidification or "clumping" action takes place) broken up into distinct, discrete "islands" of oil on the surface of the water and thereby leaving larger surface areas of clear water having no oil film and/or emulsion which would otherwise hinder passage of sunlight through the water.

Next, it should be noted that relatively low "dosage" or loading rates of the herein described flocculation agents generally will produce this herding effect while relatively higher loading rates generally will promote formation of buoyant, (i.e., floating, as opposed to sinking) quasi-solid, amine-substituted clay/oil flocculate "clumps." Incidentally, for the purpose of this patent disclosure the terms "loading rates", "usage rates", "dosage rates,", "concentrations", etc. should be regarded as synonymous and they usually will be expressed in pounds of clay per U.S. gallon of oil or in some cases, as indicated, as a percentage, by weight, of the clay to the oil. In any event, in general, the herding effect takes place at loading rates far less than what is usually needed to form the semi-solid clumps. Thus such differences in loading rates represents a means of controlling our process.

For example, applicants have produced herding effects at loading rates as low as about one-tenth of a pound of amine-substituted clay per gallon of oil. Again, in some cases this "herding" action may be all that is required and/or desired, but in most cases the formation of applicants' semi-solid clumps or clots is the more desired end result. Applicants have also found that loading rates higher than about three-tenths of a pound of clay per gallon of oil tend to produce semi-solid clumps rather than the "herding" effect. The most preferred loading rates for producing such clumps generally will be from about five-tenths of a pound of clay per gallon of oil to about one and one-half pounds of clay per gallon of oil. Again, loading rates much greater than those needed to form the desired semi-solid clumps can be employed, but such higher load rates are not preferred because they may produce "sinkable" clumps. However, it also should be specifically noted that loading rates high enough in theory to sink the resulting clumps can be employed before any sinking of the resulting clumps takes place—a result which applicants' process is designed to avoid.

Indeed, in seeking an upper limit to the loading rate (with the expression "upper limit" being defined as the loading rate which causes the resulting oil/clay clumps to sink), applicants found that loading rates up to about 3.5 pounds of organoclay per gallon oil produced clumps which still floated even though they theoretically had densities greater than that of sea water. This seemingly paradoxical phenomenon is probably caused by surface forces and/or surface chemistry phenomena between our flocculation agents and water as well as by the entrapment of air in said clumps.

Again, however, as a practical matter, use of loading rates greater than those needed to produce clumps (e.g., loading rates preferably ranging from about 0.5 to 1.5 pounds of clay per gallon of oil) having sufficient mechanical strength to be picked up without unacceptable amounts of breakage of said clumps represents an unnecessary economic expense and introduces the possibility of producing clumps which may sink. Applicants have found that, in general, clumps having sufficient mechanical strength to be effectively collected by a wide variety of mechanical means without breaking said clumps into unacceptably small pieces (e.g., those having average diameters of less than one tenth of an inch) can be produced at loading rates less than about 2.0 pounds of clay per U.S. gallon of virtually any kind of oil product.

That is to say that, in theory, "floatability" implies that the resulting clumps have densities less than about 1.025 in the case of sea water spills and densities less than 1.00 in the case of spills in fresh water. Such clumps will have an oil component generally having a density from about 0.85 to 0.98 and a clay components generally having a density greater than 2.0 and less than 3.0 (for example, most of applicants' preferred organoclays will have densities between about 2.5 and about 2.8). Consequently, agglomeration of these two kinds of material will produce clumps having densities greater than that of the oil component alone. In general, it is preferred that the density of the clumps resulting from this process have densities less than that of the water with which the oil is associated. That is to say that in general, the resulting clumps preferably, but not necessarily, will have specific gravities less than 1.0 (i.e., the specific gravity of "fresh" water) or, in the case of oil spills in sea water, such clumps preferably should have specific gravities less than 1.025 (i.e., the specific gravity of sea water). In other words, since the organoclays themselves generally will have specific gravities from about 1.5 to about 2.0 and a bulk density of 32 lbs. to 45 lbs. per cubic foot (specific gravity bulk 0.5 to 0.7), care should be taken not to add so much of the amine-treated clay to a given area that the resulting clumps will have specific gravities greater than that of the water in which the oil spill has occurred. Again, however, clumps having theoretically calculated densities which would cause them to sink will, in fact, float owing to air entrapment, surface chemistry, etc.

At this point, it also should be reiterated that applicants' process seeks to form organoclay/ oil clumps which have the opposite character with respect to "sinkability" from those agglomerates produced by the process of the 477 patent; i.e., the clumps produced by applicants' process are specifically designed to "float" while those produced by the process of the 477 are specifically designed to "sink" so that they will serve to plug up leaks in an artificial liner of an artificially constructed toxic waste pond. With respect to the 477 patent reference, it also should be noted in passing that petroleum is a nonpolar material and thus can be distinguished from the majority of contaminant materials mentioned in the 477 patent which are associated with polar solvents.

The organoclay herding and/or agglomeration agents used in applicants' process are preferably sprayed on the spilled oil in substantially dry, finely divided, particle forms. However, in some cases they might be mixed with a liquid carrier such as water or other ingredients such as alcohols and the like. Ship mounted spray guns can be employed for these purposes or the amine-substituted clays can be dispensed from aircraft by various "cropdusting" spray techniques known to the art. For example, one particularly preferred method of dispersing the herein disclosed flocculation agent(s) onto an oil slick is through the use of bags carried under a helicopter by means of a sling. When the helicopter arrives over the oil spill a dump spout on the bag can be opened by a line controlled from the helicopter. The down-draft from the rotors will disperse the powder over the spill. The proper dump altitude will be determined from experience, observation, and will no doubt be dependent upon those local wind conditions which exist during the dispensing operation.

The organoclay particles dispensed by such methods can vary in size, but generally speaking smaller particles are preferred. For example, at least a major portion or, in some cases, substantially all of the organoclay particles will preferably be sized at about 200 mesh or smaller. Multiple applications of these organoclay agents are also contemplated. Other active or inactive ingredients can also be simultaneously dispensed in particle forms as homogenous mixtures or as separately applied materials.

Most preferably, the quasi-solid organoclay/oil clumps resulting from the use of appropriate loading rates will have average diameters greater than about one tenth of inch. In most cases, however, the resultant clumps will have even larger average diameters—e.g., greater than about one inch. Indeed, clumps having average diameters greater than three inches will often result from applicants' process. In general, larger clump sizes are produced by the use of relatively larger loading rates of the organoclay (e.g., those between about one and about two pounds of clay per gallon of oil). Again, care should be taken when using such relatively higher loading rates, not to add so much of the organoclay to a given spill that sinkable clumps are in fact formed. Regardless of their size, however, the quasi-solid state of such organoclay/ oil clumps—in conjunction with the fact that they are rendered in the form of floating units having average diameters greater than one tenth of an inch—makes them highly susceptible to being mechanically collected without having to simultaneously collect and treat huge quantities of water as part of the overall cleanup process.

Such mechanical collection of the floating, quasi-solid flocculate clumps from the surface of the water will be most efficient when the mechanical collection means employed allows most of the water collected and/or taken up with the quasi-solid clumps to be drained away from said clumps before they are actually taken on board a cleanup vessel, hauled ashore or otherwise collected. By way of example, the mechanical collection means could include, but not be limited to, paddle collectors, water "porous" conveyor belts, screens, "raking" devices, floating fences and/or nets- —and especially seine nets having mesh sizes less than the average diameter of the clay/oil flocculate clumps being collected. It also should be noted in passing that local conditions and available mechanical equipment may dictate certain clump "size" preferences. For example, larger clumps may be easier to pick up with certain kinds of mechanical equipment (e.g., "paddle" pick up devices) while smaller clumps generally will be more effective in attracting and further agglomerating oil as such smaller clumps are being collected for pickup, e.g., through the use of seine nets. Again, in some instances multiple applications of applicants' treated clays may aid in the production of larger clump sizes tailored to being collectible by different mechanical operations.

It also should be noted that, for the purpose of this patent disclosure, the expression "quasi-solid" also can be taken to mean that the organoclay/oil clumps resulting from applicants' process, even in a wet state (such as that existing just after such clumps are taken from the water by mechanical means and allowed to "drain" before being taken on board ship), will have an angle of repose ("angle of repose"—as that term is employed in tests commonly used to measure a material's tendency to "flow") of at least 20 degrees. That is to say that the clumps produced by the herein disclosed process can be piled up at this angle without flowing "downhill". In most cases, however, a mass of the clumps formed by applicants' process will be characterized by having an angle of repose far greater than 20 degrees. Indeed, in many cases, the clumps resulting from the herein disclosed process may even have an angle of repose greater than 90 degrees, i.e., the clump units may well be so cohesive that they will even support an "overhang" of such organoclay/oil clump units if they were subjected to such "angle of repose" test measurements. As previously noted, applicants also have found that the individual clumps formed by their process have more than enough mechanical strength to readily resist breakage into smaller units as a result of the rough mechanical handling operations they would experience in being collected in the water, picked from the surface of the water, drained and placed in a cleanup container.

In effect, this embodiment of applicants' overall process converts the inherently more difficult problem of gathering and separating a liquid from a liquid to the inherently less difficult problem of gathering and separating a floating, immiscible solid from its associated liquid. In those embodiments of the herein disclosed process employing higher loading rates, the oil from water separation problem is solved by applying those amounts of organoclay flocculation agents to an oil spill so as to produce organoclay/oil clumps having a proper state (quasi-solid), a proper density (e.g., the clumps will be "floatable" and preferably have densities between about 0.85 and about 0.98) and a proper physical size (greater than one tenth of an inch on the average) in order to render those clumps susceptible to being retrieved without having simultaneously to take up large volumes of water. Thus, applicants' process stands in sharp contrast to those prior art processes using untreated clays which do not "solidify" the agglomerated oil, but rather merely agglomerate it into larger drops of "liquid" oil.

Applicants' process has other virtues as well. For example, the clumps produced by this process will form quickly, e.g., in less than about an hour and, once formed, persist in their quasi-solid state for very long periods of time, e.g., days and even weeks. That is to say they will persist in "solid" forms for periods of time long enough for cleanup vessels to get to the spill site and begin operations. Moreover, its use tends to prevent migration of the oil spill since floating quasi-solids are less mobile in water than oil droplets which are broken down into finer and finer—and hence more "mobile"—dispersions by the action of waves and/or currents. Moreover, even if these quasi-solid clumps do land on beaches, they will not soak, wet or drain into a sand substrate in the manner of a "liquid" oil which has been agglomerated to a more viscous, but not solidified, form through the use of "untreated" (i.e., not having the herein described amine compounds) clays. The clumps resulting from applicants' process also will not commence to flow in the presence of sunlight in the event they do land on a beach. Hence, applicants' clumps have the added advantage of being able to be cleaned from the beach by mechanical means, e.g., sifting or screening devices, capable of separating one solid from another.

Expressed in patent process terminology, applicants' method for flocculating oil dispersed in an oil-contaminated portion of a natural body of water will generally comprise: (1) adding to said oil-contaminated portion of water, a flocculant comprised of an amine-substituted clay formed by reacting a water swelling clay with an amine compound selected from the group consisting of a primary amine salt, a secondary amine salt, a tertiary amine salt or a quaternary ammonium salt (and preferably comprising amine salts of the type just noted and further comprising organosubstituents having from 1 to 24 carbon atoms), (2) adding said flocculant to said oil-contaminated portion of the body of water in amounts sufficient to promote formation of: (1) islands of agglomerated oil/clay materials from oil films or oil/water emulsions and/or (2) buoyant, quasi-solid organoclay oil flocculate clumps having average diameters greater than about one tenth of inch and, where applicable (e.g., in the case of formation of applicants' oil/clay clumps), (3) mechanically collecting said buoyant, quasi-solid flocculate clumps from the surface of the water or beachfront area if retrieval of said clumps is a desired object of the process. Again the herein disclosed processes also may be employed in situations where the agglomerated islands of oil clay material and/or quasi-solid clumps are not mechanically removed from the surface of the water, but rather are further treated. Such further treatment might include further chemical treatment of the oil contained in the islands and/or clumps and/or digestion of said oil by microorganisms.

The preferred clay starting materials for producing the amine-substituted (and/or organoamine-substituted) clays which are employed in our processes are smectite-type clays, particularly those having a cation exchange capacity of at least 75 milliequivalents per 100 grams of clay. Such ion exchange capacities may exist in certain natural clays. However, those natural clays having lower ion exchange capacities may be chemically treated in order to give them higher ion exchange capacities. For example, such clays can be converted to more suitable metallic ion containing forms, e.g., sodium forms, if they are not already in such forms in their natural state. This can be effected by well known cation exchange reactions with, say, soluble sodium compounds. For example, such exchanges may be readily accomplished by mixing such clays with an aqueous solution of a sodium salt such as sodium carbonate or sodium chloride and then recovering a high sodium content clay product. In either case, the object is to obtain and/or prepare clays suitable for reaction with the amine (and/or organoamine) compounds which create the compounds which are used in the herein disclosed oil spill cleanup process.

Montmorillonite, bentonite, beidelite, hectorite, saponite, sepiolite and stevensite clays are especially well suited for producing our particular flocculation or agglomeration agents. Mixtures of such clays can be used as well. Among the clays noted above, montmorillonite clays selected from the group consisting of sodium montmorillonite, calcium montmorillonite or magnesium montmorillonite are especially well suited for creation of the amine-substituted (and/or organoamine-substituted) clays which are subsequently used to carry out the herein disclosed oil spill cleanup processes. One preferred montmorillonite type clay for use in such clay/amine compound reactions is a sodium montmorillonite clay having at least a 50% milliequivalent exchangeable cation concentration (meq/%). Even more preferred are those sodium montmorillonite clays having between about 60 and about 75% sodium meq/%. Perhaps the most preferred montmorillonite clays for the production of the flocculation agents of our process are those which constitute the principal constituents of bentonite rock. Generally they have the chemical compositions and characteristics described in Berry and Mason, "Mineralogy", 1959, pp. 508–509. Still other organoclays which may be used for the practice of this invention might comprise the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methylbis (2-hydroxyethyl) octodecyl ammonium bentonite.

The natural or ion-exchanged enhanced clay starting materials can be reacted with the hereinafter described amine compounds in various ways. By way of example, such reactions may be accomplished by merely mixing or mulling a dry clay material with the selected amine. Alternatively, wet processes may be used wherein the clay is slurried in fresh water and an amine and/or ammonium salt added to the slurry. In general, the amounts of such ammonium salts substituted on the clays can vary between about 0.5% to about 50% of the resulting organoclay's weight. The clay/amine reaction products are then filtered or centrifuged from the slurry and dried to a low moisture content. However, a small percentage of water may sometimes be retained to attain maximum product efficiency. For example, the retention of a few percent of water, e.g., between about 1 and about 5% water based on a final organo ammonium clay product may prove beneficial.

For the purposes of this patent disclosure, the term "organoclays" has been, and will be, used to describe the more preferred flocculation or agglomeration agents used in our processes, i.e., water swelling clays having certain "organoamine" or "organoammonium" ion substituents thereon. Most preferably, the "organo" portion of our organoclays will be provided in the form of an organosubstituent which forms a part of an amine group (i.e., a part of a primary, secondary and/or tertiary amine salt) which is, in turn, substituted on to the clay molecule. Generally speaking, such organo groups most preferably will be an organo group selected from the group consisting of aliphatic, aromatic, cyclic, heterocyclic, or polyamine groups. Such organo groups most preferably will range in size from 1 to 24 carbon atoms. The most preferred of these are those organo substitutents having at least 10 carbon atoms such as those having dodecyl, hexadecyl, octadecyl, dimethyloctadecyl groups. In general, however, the most preferred organoammonium ion substituents for our purposes are those described in U.S. Pat. Nos. 2,531,427 and 2,966,506 and the teachings of both of these patents are incorporated herein by reference.

Speaking from a molecular structure point of view, some of the most highly preferred organoclays which can be used in the practice of this invention will comprise one or more of the following quaternary ammonium cation substituted clays:

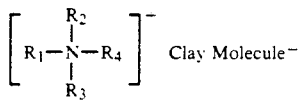

wherein $R_1$ is an alkyl group having at least 10 carbon atoms and up to 24 carbon atoms, and preferably having a chain length of from 12 to 18 carbon atoms; $R_2$ is hydrogen, benzyl or an alkyl group of at least 10 carbon atoms and up to 24 carbon atoms, and preferably from 12 to 18 carbon atoms; and $R_3$ and $R_4$ are each hydrogen or lower alkyl groups, viz., they contain carbon chains of from 1 to 4 atoms, and preferably are methyl groups.

Some other preferred organoclays for our purposes can be represented by the formula:

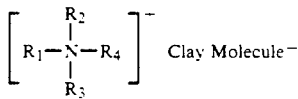

wherein $R_1$ is $CH_3$ or $C_6H_5CH_2$; $R_2$ is

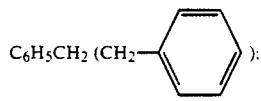

and $R_3$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms. One particularly preferred organoclay species is alkyl dimethyl benzyl ammonium chloride.

It also should be understood that the organoclay flocculation agents of this patent disclosure may further comprise other active ingredients. That is to say that applicants' flocculation agents may contain ingredients (other than "inert" carrier fluids—if carrier fluids are in fact employed) which may, in certain circumstances aid in the overall practice of this invention. For example, applicants' flocculation agent composition may further comprise one or more polar organic compounds. The use of these additional ingredients may be especially efficacious in sea water. That is to say that the addition of the polar organic compound may provide for substantial reduction in the amount of amine-substituted clay required to achieve the same substantial solidification of the oil. Again, this may be especially true in the case of oil spills in sea water. If employed, such polar organic compound(s), preferably, will constitute from about 0.01 to about 10 parts by weight of the polar organic compound(s) per 100 parts by weight of the amine-substituted clay. Suitable polar organic compounds for the practice of our invention would include alcohols, carbonates, acetates, ethers, ketones, benzoates and halogenated hydrocarbons and especially those having between about 1 and about 10 carbon atoms. Within these broad groups the most suitable polar organic compounds will include diethyl carbonate, propylene carbonate, methylacetate, ethylacetate, isoamylacetate, diisopropyl ether, diethyl ether, methylethyl ketone, diethyl ketone, diisopropyl ketone, ethyl benzoate, trichloroethane, carbon tetrachloride, and chlorobenzene. However, in general, the most preferred of these compounds will be the least expensive polar organic compounds. The most preferred of these can be taken from the group consisting of the lower molecular weight alcohols having between 1 and about 8 carbon atoms, particularly: methyl alcohol, ethyl alcohol, n-propyl alcohol, isopropyl alcohol, hexyl alcohol and tert-butyl alcohol.

In general, these polar organic compounds can be added to the amine-substituted clay in any of several ways known to this art, e.g., by incorporating the polar organic compound into the organoclay to produce an organoclay/polar organic compound mixture for later use as a flocculation agent or by physically mixing the organic compound with the clay as they are dispensed upon the spilled oil.

DESCRIPTION OF PREFERRED EMBODIMENTS

It should first be noted that in applicants' initial series of experiments, which were made in anticipation of a "sinking" of the resulting clumps in the manner taught in the 477 patent, applicants used formulations having known floatable materials such as UV-resistant polystyrene beads, chopped hemp fibers, gas-forming chemicals, etc. as a part of each flocculation agent compositions then under consideration. The "controls" against which these floatable material—containing formulations were tested, were simply the herein disclosed organoclays used without the additional flotation materials (beads, hemp fibers, etc.) noted above. Quite surprisingly, the "controls" produced agglomerated materials which continued to float at unexpectedly high loading rates (e.g., those implying theoretical densities significantly greater than 1.0). That is to say that applicants found that the additional floatable materials such as sawdust, beads, etc., simply were not needed to form either the oil/clay islands or the oil/clay "clumps".

In response to this discovery, and in order to test the effectiveness of various clays (both "amine treated" organoclays as well as analogous, "untreated" clays), an aquarium test tank was filled with sea water. This permitted observation and photography of the top, underside, edges and bottom of the test tank. A given loading rate was chosen for a given set of experiments. Various loading rates were held constant, e.g., at 2.0 pounds of clay per U.S. gallon of oil for a given test series. By way of example, one such series of experiments involved placement of 300 ml of Ventura Crude oil on a simulated sea water composition in a tank which formed a sea water surface area having 9"×18" dimensions. These conditions produced a system having an initial oil spill thickness of about 2.87 mm. Thus, the loading rate, in effect, was two pounds per gallon of the Ventura crude oil. This represented a loading rate of approximately 25% by weight. Various visual observations of the system were made over time. Various observations were made and recorded. By way of example, the observations made with respect to a treated montmorillonite clay/Ventura oil system is shown as Table 3. Analogous observations also were made for analogous systems employing "untreated" clays. For example the results of such observations for "untreated" sodium montmorillonite clay and/or untreated sepiolite clay are shown in Tables 1 and 2 respectively. Again, the results of these tests are to be contrasted with the results shown in Table 3 which indicates the results of using an amine-treated clay of the type employed in this process. This particular table (Table 3) depicts the results of using a montmorillonite clay treated with dimethyl di(hydrogenated tallow) ammonium chloride.

In comparing these results, note for example the result of using an untreated clay such as sodium montmorillonite or sepiolite was the formation of an unconsolidated slime which adhered to the sides and bottom of the tank. It also should be noted that, in both cases, these untreated clays sank at least a part of the oil. The sunken oil formed on the bottom of the tank and had no form other than that produced by surface tension. Applicants also noted that many of the liquid oil "clots" produced by the untreated clays which formed on the bottom of the tank eventually rose again to the surface, apparently as a result of an unknown gas-forming reaction. When such rising clot reached the surface, they released a bubble of gas and the oil of the clot simply rejoined the unconsolidated oil on the surface. It was not possible to discern any evidence of solidification of these materials in the regions where such rising "clots" had surfaced. Moreover, the entire surface remained uniformly slimy and unconsolidated. Such materials also covered the entire top of the sea water in the tank. That is to say there were no openings created in the resulting oil slick. The "clots" which remained on the bottom could not be retrieved, except by pipet, since they had no mechanical strength. In effect, materials were simply a liquid only slightly more viscous than the original crude oil itself. Agitation of the water in the tank demonstrated that no solidification had taken place.

Such observations were contrasted with results obtained after applying amine-substituted clays to the oil under otherwise comparable test conditions. Again, the results given in Table 3 are more or less typical of those found for various other analogous experiments, e.g., as those using loading rates different from 2.0 pounds/gallon. Those loading rates falling in applicants' 0.5 to 1.5 pounds/gallon preferred range produced clumps generally having as much mechanical strength as those produced at higher loading rates, e.g., those produced at loading rates of 3.5 pounds/gallon. Next, it should be emphasized that there were no "sinking clots" created by the use of applicants' amine-treated clays over the entire loading range of 0.1 to 3.5 pounds of clay/gallon of oil. All clumps created in this manner remained afloat.

Mild agitation, simulating wave action, immediately opened up large areas of open water, as the solidified clumps formed up into balls and chunks of varying size, all of which remained afloat and were easily retrieved either singly or by netting without any significant breakage. The results of the repitition of such tests in many variations of these tests show that when amine-substituted clays are added to oil spilled on water in quantities of from about 0.3 to about 3.5 pounds of such clay per U.S. gallon of oil will produce quasi-solid, floating clumps of oil/clay having sufficient mechanical strength to be picked up out of the water without appreciable breakage of said clumps. Such clumps have average diameters of at least one-tenth of an inch and in most cases will be significantly larger diameters on the order of 2–3 inches, or even larger.

TABLE 1

Test Results Using Untreated Sodium Montmorillonite
Observation #

| | | |
|---|---|---|
| 0A | Edge view of slick - no clay added | |
| 1A | 2 min after drop of Sodium Montmorillonite | |
| 2A | 3 min after drop of Sodium Montmorillonite | |
| 3A | 4 min after drop of Sodium Montmorillonite | |
| 4A | 5 min after drop of Sodium Montmorillonite | |
| 5A | 6 min after drop of Sodium Montmorillonite | shows sunken clots; also some clay on top; oil on top is unaffected, untreated. Clots on bottom extremely fluid; no "forming." |
| 6A | 8 min after drop of Sodium Montmorillonite | |
| 7A | 10 min after drop of Sodium Montmorillonite | |
| 9A | 12 min after drop of Sodium Montmorillonite | |

Note: Some of the clots that initially dropped to bottom developed internal gas and came back up. These rose very rapidly, and broke through the untreated oil. "burped" off their gas, and simply disappeared (as clots, that is) in the plain oil on top.

TABLE 2

Test Results Using Untreated Sepiolite
Observation #

| | | |
|---|---|---|
| 10A | Edge view of slick - no clay added | |
| 11A | 3 min after drop of Sepiolite | Same "rise" activity as with Sodium Montmorillonite. Clots on bottom slightly more firm. Oil on top remained fluid; no "forming." |
| 12A | 6 min after drop of Sepiolite | |
| 13A | 30 min after drop of Sepiolite | |
| 14A | 30+ min after drop of Sepiolite | |
| 16A | 30+ min after drop of Sepiolite | |
| 17A | 30+ min after drop of Sepiolite | |
| 18A | 30+ min after drop of Sepiolite | |
| 19A | 30+ min after drop of Sepiolite | |

TABLE 3

Test Results Using Treated Clay
Observation #

| | |
|---|---|
| 1 | Edge view before drop |
| 2 | 5 min after drop - |

TABLE 3-continued

Test Results Using Treated Clay

| Observation # | | |
|---|---|---|
| 3 | 10 min after drop - | nothing falling |
| 4 | 15 min after drop - | |
| 5 | 15+ min after drop - top view, surface not disturbed | |
| 6 | 15+ min after drop - top view, surface not disturbed | |
| 7 | 15+ min after drop - undersurface, not disturbed | |
| 8 | 15+ min after drop - mild agitation; clots shown - all floated back up | |
| 9 | 15+ min after drop - heavy agitation | |
| 10 | 15+ min after drop - heavy agitation | |
| 12 | 15+ min after drop - heavy agitation | shows solidification, flotation, clear water on top |
| 13 | 15+ min after drop - heavy agitation | |
| 14 | 15+ min after drop - heavy agitation | |

Finally, it should be understood that various changes may be made in the details and arrangements of this process as well as in the procedures and functions carried out by them, without departing from the scope of the invention which consists of the matter shown and described herein and set forth in the hereinafter appended claims.

Thus having disclosed our invention, we claim:

1. A process for flocculating oil associated with an oil-contaminated portion of a natural body of water, said process comprising:
   (1) adding to said oil-contaminated portion of water a flocculant comprised of an amine-substituted clay formed by reacting a water swelling clay with an amine compound selected from the group consisting of a primary amine salt, a secondary amine salt, a tertiary amine salt or a quaternary ammonium salt; and
   (2) adding said flocculant to said oil-contaminated portion of water in amounts sufficient to promote formation of buoyant, quasi-solid organoclay oil flocculate clumps which float in the water and which have average diameters greater than about one tenth of an inch.

2. The process of claim 1 wherein the amine compound further comprises an organo group having from 1 to 24 carbon atoms.

3. The process of claim 1 wherein the amine compound further comprises an organo group having from 10 to 24 carbon atoms and wherein said organo group is selected from the group of organo groups consisting of dodecyl, hexadecyl, octadecyl and dimethyloctadecyl.

4. The process of claim which further comprises mechanically collecting said buoyant, quasi-solid flocculate clumps from the surface of the water.

5. The process of claim 1 which further comprises mechanically gathering the flocculate clumps from a shore near the natural body of water.

6. The process of claim 1 wherein the water swelling clay is selected from the group consisting of montmorillonite, saponite, hectorite, beidellite, sepiolite nontronite, stevensite and sauconite.

7. The process of claim 1 wherein the water swelling clay is a montmorillonite clay selected from the group consisting of sodium montmorillonite, calcium montmorillonite or magnesium montmorillonite.

8. The process of claim 1 wherein the amine compound with which the water swelling clay is reacted is an organic amine which is such that a compound having a structural formula:

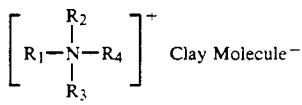

is produced wherein $R_1$ is an alkyl group having at least 10 carbon atoms and up to 24 carbon atoms, and preferably having a chain length of from 12 to 18 carbon atoms; $R_2$ is hydrogen, benzyl or an alkyl group of at least 10 carbon atoms and up to 24 carbon atoms, and preferably from 12 to 18 carbon atoms; and $R_3$ and $R_4$ are each hydrogen or lower alkyl groups.

9. The process of claim 1 wherein the amine compound with which the water swelling clay is reacted is an organic amine which is such that a compound having a structural formula:

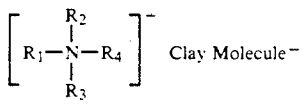

is produced wherein $R_1$ is $CH_3$ or $C_6H_5CH_2$; $R_2$ is

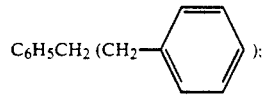

and $R_3$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms.

10. The process of claim 1 wherein the water swelling clay is a montmorillonite clay and the amine compound is alkyl dimethyl benzyl ammonium chloride.

11. The process of claim 1 wherein the amine-substituted clay flocculant is a mixture which further comprises a polar organic compound which comprises from about 0.01 to about 10 parts by weight of the polar organic compound per 100 parts by weight of the amine-substituted clay flocculant.

12. The process of claim 1 wherein the amine-substituted clay flocculant further comprises a polar organic compound selected from the group of polar organic compounds consisting of isopropyl alcohol, hexyl alcohol, ethyl acetate and methyl ethyl ketone.

13. The process of claim 1 wherein the mechanical collection of the floating, quasi-solid flocculate clumps includes the use of floating nets having mesh sizes capable of collecting amine-substituted clay/oil flocculate clumps having average diameters greater than about one tenth of an inch.

14. The process of claim 1 wherein mechanically collecting the floating, quasi-solid flocculate clumps includes the use of seine nets having mesh sizes capable of collecting amine-substituted clay/oil flocculate clumps having average diameters greater than about one tenth of an inch and includes the step of allowing water initially taken up with said clumps to drain away before they are taken on board a cleanup vessel or otherwise retrieved.

15. A process for flocculating oil associated with or on oil-contaminated portion of a natural body of sea water, said process comprising:
(1) adding to said oil-contaminated portion of sea water an organoclay flocculant comprised of an amine-substituted montmorillonite clay formed by reacting a montmorillonite clay with an amine compound selected from the group consisting of a primary amine salt, a secondary amine salt, a tertiary amine salt or a quaternary ammonium salt which each further comprises an organosubstituent having from 1 to 24 carbon atoms; and
(2) adding said organoclay flocculant to the sea water in amounts sufficient to promote formation of buoyant, quasi-solid, amine substituted montmorillonite clay/oil flocculate clumps which float in the sea water and which have average diameters greater than about one tenth of an inch.

16. The process of claim 15 wherein the organo-clay flocculant further comprises an organo group having from 10 to 24 carbon atoms selected from the group of organo groups consisting of dodecyl, hexadecyl, octadecyl and dimethyloctadecyl.

17. The process of claim 15 wherein the amine compound is alkyl dimethyl benzyl ammonium chloride.

18. The process of claim 15 which further comprises mechanically collecting said floating, quasi-solid flocculate clumps from the surface of the sea water if retrieval is desired.

19. The process of claim 15 wherein the montmorillonite clay is a montmorillonite clay selected from the group consisting of sodium montmorillonite, calcium montmorillonite or magnesium montmorillonite.

20. The process of claim 15 wherein the amine compound with which the montmorillonite clay is reacted is an organic amine compound having at least 10 carbon atoms, but no more than 24 carbon atoms, in the organic portion of the amine compound's chemical structure.

21. The process of claim 15 wherein the flocculant is added to the contaminated portion of the sea water in amounts which produce organoclays/oil clumps having specific gravities less than about 0.98.

22. The process of claim 15 wherein the flocculant is a mixture which further comprises a polar organic compound which comprises from about 0.01 to about 10 parts by weight of the polar organic compound per 100 parts by weight of amine substituted montmorillonite clay.

23. The process of claim 15 wherein the flocculant is a mixture which further comprises a polar organic compound selected from the group consisting of isopropyl alcohol, hexyl alcohol, ethyl acetate and methyl ethyl ketone.

24. The process of claim 15 wherein mechanically collecting the floating, quasi-solid flocculate clumps includes the use of floating nets having mesh sizes capable of collecting amine substituted montmorillonite clay/oil flocculate clumps having average diameters greater than about 1 quarter inch.

25. The process of claim 15 wherein mechanically collecting the floating, quasi-solid flocculate clumps includes the use of seine nets having mesh sizes capable of collecting amine substituted clay/oil flocculate clumps having average diameters more than about one tenth of an inch.

26. The process of claim 15 which further comprises digesting the amine-substituted clay/oil flocculate with a microorganism.

27. A process for herding oil associated with an oil-contaminated portion of a natural body of water, said process comprising:
(1) adding to said oil-contaminated portion of water a herding agent comprised of an amine-substituted clay formed by reacting a water swelling clay with an amine compound selected from the group consisting of a primary amine salt, a secondary amine salt, a tertiary amine salt or a quaternary ammonium salt; and
(2) adding said herding agent to said oil-contaminated portion of water in amounts sufficient to promote herding of the oil into islands of oil separated by surfaces of water containing substantially no oil.

28. The process of claim 27 wherein the water swelling clay is selected from the group consisting of montmorillonite, saponite, hectorite, beidellite, sepiolite nontronite, stevensite and sauconite.

29. The process of claim 27 wherein the water swelling clay is a montmorillonite clay selected from the group consisting of sodium montmorillonite, calcium montmorillonite or magnesium montmorillonite.

30. The process of claim 27 wherein the amine compound with which the water swelling clay is reacted is an organic amine which is such that a compound having the structural formula:

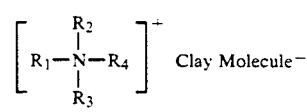

is produced wherein $R_1$ is an alkyl group having at least 10 carbon atoms and up to 24 carbon atoms, and preferably having a chain length of from 12 to 18 carbon atoms; $R_2$ is hydrogen, benzyl or an alkyl group of at least 10 carbon atoms and up to 24 carbon atoms, and preferably from 12 to 18 carbon atoms; and $R_3$ and $R_4$ are each hydrogen or lower alkyl groups.

31. The process of claim 27 wherein the amine compound with which the water swelling clay is reacted is an organic amine which is such that a compound having a structural formula:

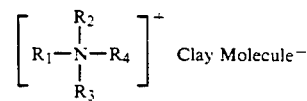

is produced wherein $R_1$ is $CH_3$ or $C_6H_5CH_2$; $R_2$ is

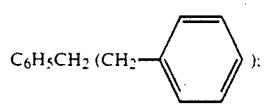

and $R_3$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms.

32. The process of claim 27 wherein the water swelling clay is a montmorillonite clay and the amine compound is alkyl dimethyl benzyl ammonium chloride.

33. The process of claim 27 wherein the flocculant is a mixture which further comprises a polar organic compound which comprises from about 0.01 to about 10 parts by weight of the polar organic compound per 100 parts by weight of an organoclay flocculant.

34. The process of claim 27 wherein the organoclay flocculant is a mixture which further comprises a polar organic compound selected from the group of polar organic compounds consisting of isopropyl alcohol, hexyl alcohol, ethyl acetate and methyl ethyl ketone.

35. A process for herding oil associated with or on oil-contaminated portion of a body of sea water, said process comprising:
(1) adding to said oil-contaminated portion of sea water an organoclay flocculant comprised of an amine-substituted montmorillonite clay formed by reacting a montmorillonite clay with an amine compound selected from the group consisting of a primary amine salt, a secondary amine salt, a tertiary amine salt or a quaternary ammonium salt which each further comprises an organosubstituent having from 1 to 24 carbon atoms; and
(2) adding said organoclay flocculant to sea water in amounts sufficient to promote herding of the oil into islands of oil/clay material separated by water containing substantially no oil.

36. The process of claim 35 wherein the montmorillonite clay is selected from the group consisting of sodium montmorillonite, calcium montmorillonite or magnesium montmorillonite.

37. The process of claim 35 wherein the amine compound with which the montmorillonite clay is reacted is an organic amine which is such that a compound having the structural formula:

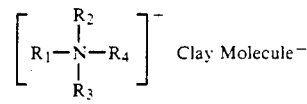

is produced wherein $R_1$ is an alkyl group having at least 10 carbon atoms and up to 24 carbon atoms, and preferably having a chain length of from 12 to 18 carbon atoms; $R_2$ is hydrogen, benzyl or an alkyl group of at least 10 carbon atoms and up to 24 carbon atoms, and preferably from 12 to 18 carbon atoms; and $R_3$ and $R_4$ are each hydrogen or lower alkyl groups.

38. The process of claim 35 wherein the amine compound with which the montmorillonite clay is reacted is an organic amine which is such that a compound having a structural formula:

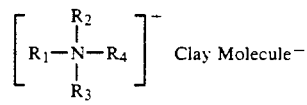

is produced wherein $R_1$ is $CH_3$ or $C_6H_5CH_2$; $R_2$ is

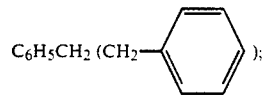

and $R_3$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms.

39. The process of claim 35 wherein the water swelling clay is a montmorillonite clay and the amine compound is alkyl dimethyl benzyl ammonium chloride.

40. The process of claim 35 wherein the islands of oil/clay are subjected to digestion by microorganisms.

41. The process of claim 35 wherein the flocculant is a mixture which further comprises a polar organic compound which comprises from about 0.01 to about 10 parts by weight of the polar organic compound per 100 parts by weight of amine substituted montmorillonite clay.

42. The process of claim 35 wherein the flocculant is a mixture which further comprises a polar organic compound selected from the group consisting of isopropyl alcohol, hexyl alcohol, ethyl acetate and methyl ethyl ketone.

* * * * *